Jan. 3, 1967    W. SEABLOM    3,295,870
PIPE FITTING
Filed Sept. 20, 1965    2 Sheets-Sheet 1
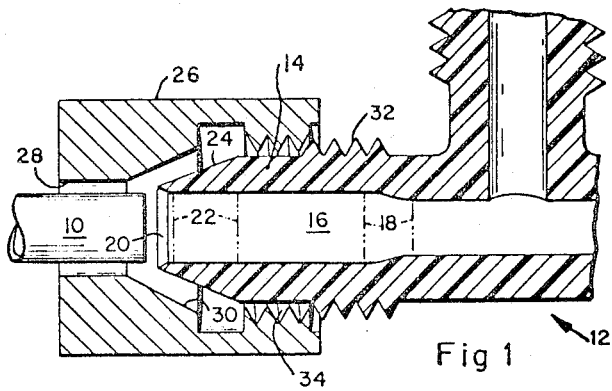
Fig 1
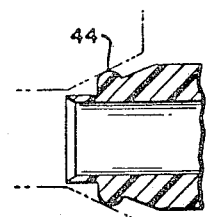
Fig 3
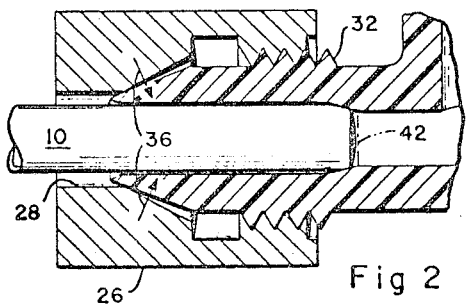
Fig 2
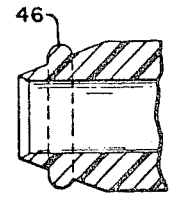
Fig 4
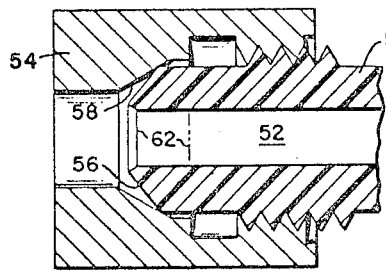
Fig 6
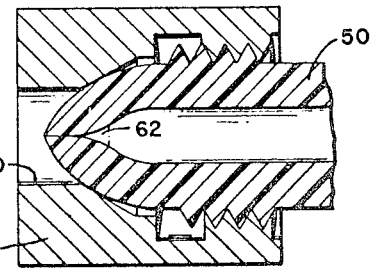
Fig 7
Fig 5
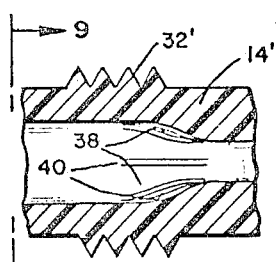
Fig 8
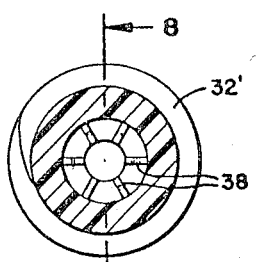
Fig 9
INVENTOR.
Wendell Seablom
BY
Attorneys

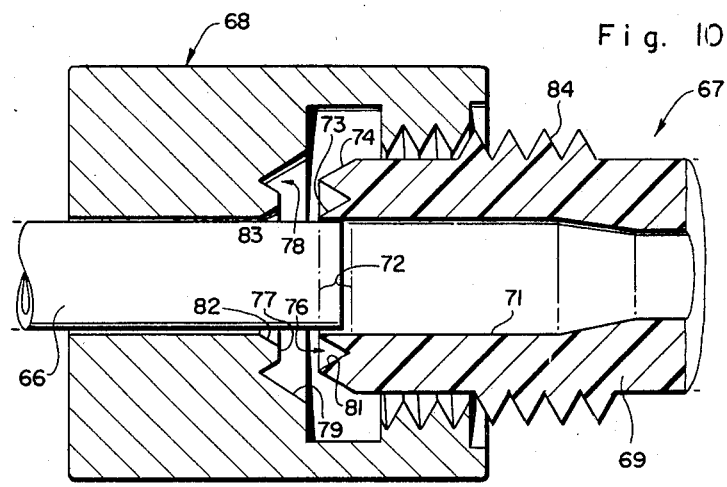
Fig. 10
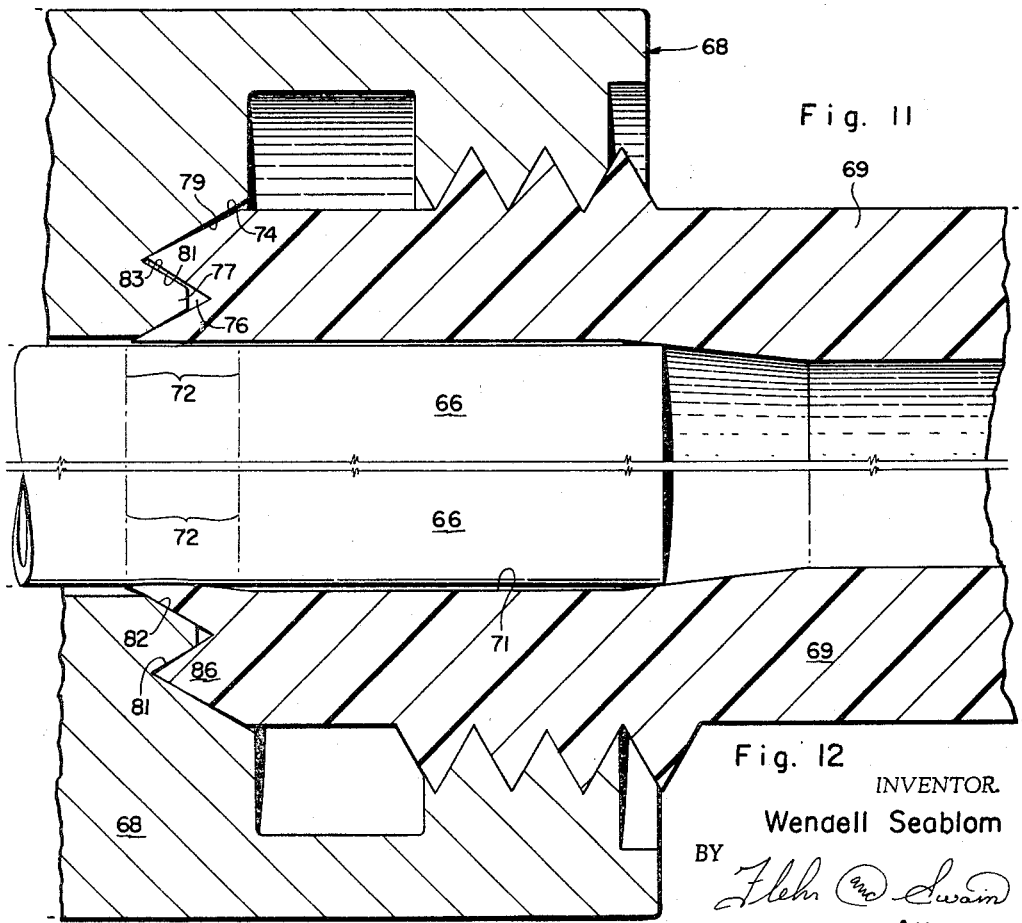
Fig. 11
Fig. 12
INVENTOR.
Wendell Seablom

UnitedStates Patent Office 3,295,870
Patented Jan. 3, 1967

3,295,870
PIPE FITTING
Wendell Seablom, 3712 Texas Drive,
Santa Rosa, Calif.
Filed Sept. 20, 1965, Ser. No. 488,460
2 Claims. (Cl. 285—331)

This invention is a continuation in part of the invention in application Serial No. 413,076, filed November 23, 1964 and now abandoned and relates to pipe fittings and more particularly to devices such as couplings, L's, T's, end caps, and the like.

In general, it is an object of the invention to provide an improved pipe fitting.

A more particular object of the invention is to provide an improved pipe fitting of a demountable style wherein sealing gaskets, O rings and the like need not be employed.

Another object of the invention is to provide an improved pipe fitting device which can be advantageously employed in crowded positions using short lengths of pipe.

A still further object of the invention is to provide a pipe fitting device of the kind described which can be manufactured at minimal expense.

Yet another object of the invention is the provision of a fitting of the above type with an improved sealing lip providing enhanced sealing in a demountable fitting.

These and other objects of the invention will be more readily apparent from the following detailed description of preferred embodiments thereof when considered in conjunction with the following drawings in which:

FIGURE 1 shows an elevation section view of a pipe fitting construction according to the invention and disposed in position to receive the end of a pipe to be coupled thereto;

FIGURE 2 is a view comparable to FIGURE 1 wherein tubing to be coupled to the pipe fitting is in position to be coupled in sealing relation to the pipe fitting;

FIGURES 3, 4 and 5 are enlarged detail views of additional embodiments of a pipe fitting device according to the invention;

FIGURE 6 shows another embodiment of the invention showing a pipe fitting construction suitable for use as an end cap;

FIGURE 7 shows the embodiment of FIGURE 6 wherein the open end of a bore has ben sealed closed so as to form an end cap;

FIGURES 8 and 9 are enlarged detail sectional views of a portion of another embodiment of the invention taken along the lines 8—8 and 9—9 respectively;

FIGURE 10 is an elevation section detail view of another embodiment of the invention showing same in disassembled condition; and FIGURES 11 and 12 are enlarged views, in section, of the embodiment of FIGURE 10, respectively showing the nearly final and final stages of sealing of the fitting to a pipe.

In general, a pipe fitting construction has been provided which is primarily useful in forming a pipe joint with a length of cylindrical tubing having a smooth outer peripheral surface at one end thereof. A fitting to be coupled to the end of the tubing is provided such as a T connection or other union. The fitting includes an elongated annular tube-engaging body portion, such as one arm of a T. The bore of the T is dimensioned to receive the end of the tubing introduced in a manner to coaxially extend a predetermined distance into the bore. The inside surface of the bore includes a surface region circumferentially uninterrupted and which extends along the bore so as to define a sealing zone adjacent the smooth outer peripheral surface of the tubing. The T or other fitting is made of a material which, while hard, includes a limited degree of resilience whereby, as will be seen further below, it can be compressed within its elastic limit to form a seal about the outer surface of the tubing and yet permits the fitting to provide a demountable coupling.

The outer end of the bore is encircled by a tapered wedging surface which cooperates with a wedging surface formed in a nut adapted to move axially along the body portion of the T until limited substantially only by refusal developed by the compressive engagement between the bore and the tubing, the material of the body portion being, as noted above, resilient such that the refusal develops at a point within the elastic limit of the material.

As more particularly now to be described and with particular reference to the drawings, a fitting for forming a pipe joint construction with the end of a length of cylindrical tubing 10 having a smooth outer peripheral surface at one end thereof is shown in FIGURE 1. The fitting shown includes a T 12 which includes an elongated annular tube-engaging body portion 14. An elongated bore 16 is formed within the body portion and is dimensioned so as to receive the end of tubing 10 which can be introduced into the bore coaxially to a predetermined extent limited generally by the gradual radial constriction of the bore provided by the converging side wall surfaces 18 thereof. In order to aid in introducing the tubing 10 into bore 16, the outer end of bore 16 is moderately bevelled to form a slight throat surface 20.

The inside surface of bore 16 includes a surface region 22 which is circumferentially uninterrupted and extends axially along the bore to define a sealing zone 22 adapted to cooperate with the smooth outer peripheral surface of tubing 10.

A wedging surface such as the conical taper 24 is formed around the outside of body portion 14 and is axially disposed laterally adjacent to the sealing zone 22 for cooperation as to be further described below.

A nut 26 provided with an axial opening 28 dimensioned to accommodate tubing 10 includes a wedging surface such as the conical surface 30 arranged to slidably cooperate with wedging surface 24 when nut 28 is drawn axially along body portion 14.

Means are provided for drawing nut 26 axially along body portion 14 to engage the two wedging surfaces 24, 30. Thus, threads 32 of uniform diameter are formed upon a right cylindrical portion of body portion 14 and engage cooperating threads 34 formed within nut 26. It will be observed that nut 26 is formed and disposed to be free to move axially until limited only by refusal developed by the compressive engagement between bore 16 (in the region of sealing zone 22) and tubing 10. Thus, as nut 26 is tightened upon threads 32, a compressive circumferentially acting force is applied to the sealing zone of the bore in the direction of the arrows 36 to provide an advantageous effect further referred to below.

The material forming nut 26 is harder than the material of body portion 14 whereby nut 26 serves to resiliently compress body portion 14.

Whereas, previous constructions have employed a nut adapted to swage a union about a pipe wherein an O ring is employed, I have discovered that if the union is made of suitable resilient plastic to be compressed within its elastic limit, an uninterrupted cylindrical band can be compressed about a tube to form a sealing interface without need for an O ring and still provide a demountable pipe coupling. For this purpose, ABS Polymers impart desirable characteristics for utilization with a brass nut. As is known, ABS Polymers are the polymer resins made by combining a styrene-acrylonitrile resin component with butadiene-acrylonitrile resin by mechanical mixing or by more complex polymerization procedures.

Preferably, the conical surface 30 diverges slightly outwardly away from the conical surface 24 whereby the initial engagement between surfaces 30 and 24 serves to compress the thinner outer wall thickness of body portion 14.

To assemble a pipe joint construction employing my fitting, a tubing 10 is inserted into bore 16 until arrested by the constricting action of surface 18. Thus, surface 18 forms a gradually constricted zone transversely of the bore commencing at a point relatively remote from the outer end of the bore. Inasmuch as the material of body portion 14 is somewhat resilient, the constricted zone serves to yield and resiliently engage the outer periphery of tubing 10 and hold it in the bore for great convenience in assembling the pipe joint construction.

In addition, where a pipe joint is being assembled in crowded quarters to opposite ends of a short length of tubing, the smooth walled tubing can be slidably moved well into bore 16 so as to minimize the extent to which the short length of tubing 10 protrudes at its outer end. Then, an adjacent joint can be aligned with tubing 10 and thereafter tubing 10 can be slidably moved partially into the bore 16 of the adjacent coupling or fitting. Thereafter, the respective nuts 26 of each of the two joints can be taken up so as to compress the fitting against the tubing in sealing relation therewith.

According to another embodiment as shown in FIGURES 8 and 9, the constricted zone is defined by a plurality of radially inwardly protruding wedge-shaped land members 38 formed at their outermost ends 40 to merge with the inside wall surface of the bore 16 so as to engage the outer periphery of tubing 10 and, when tubing 10 is urged against land members 38, members 38 serve to restrict rotation of the tubing. In the embodiment shown in FIGURES 8 and 9, parts comparable to those shown in FIGURE 1 are designated by prime marks following a comparable reference numeral.

In the foregoing, it can be seen that a constriction is formed by a protuberance extending radially inwardly of the bore and fixed with respect to the inside surface of the bore. The protuberance is formed and disposed to radially engage the outer surface of the tubing 10 and to restrict its rotation as well as to hold it in position while other manipulations are made.

As shown in FIGURE 2, when tubing 10 has been initially inserted and nut 26 is ready to be rotated, forces will be applied in the direction of arrows 36 by rotation of the nut. Compressive forces acting in the direction of arrows 36 serve not only to radially compress sealing zone 22 of bore 16 onto the outer periphery of tubing 10, but further serve to advance tubing 10 and urge it deeper into the surface of constriction 18. Thus, in FIGURE 2, a phantom line 42 designates a slight forward movement of tubing 10 which serves to form a more positive engagement with surface 18.

From the foregoing, it will be observed, therefore, to be relatively important that wedging surface 24 be oriented in the manner shown which disposes an initial axial extent thereof to present an increasing radial displacement from the axis of the bore with increasing axial displacement of points along wedging surface 24 from the outer end of the bore. In short, wedging surface 24 tapers downwardly toward the outer end of bore 16 to deliver an inward thrust to tubing 10.

Another embodiment of wedging surface 24 is shown in FIGURES 3, 4 and 5. From the three embodiments in FIGURES 3–5, there is shown wedging surfaces wherein each includes an initial axial extent presenting an increasing radial displacement from the axis of the bore with increasing axial displacement of points on the wedging surface from the outer end of the bore.

In FIGURES 3 and 4 an annular rib, 44, 46, respectively, is formed integral with the tapered end surface of a body portion comparable to that shown in FIGURE 1.

In FIGURE 3, the outer end of the bore is right cylindrically shaped in order to aid in its introduction into a nut of the type described above.

In FIGURE 5, an embodiment of the wedge surface around the bore is shown including a plurality of discrete wedges 48, each of which includes a smooth exposed surface adapted to engage the wedging surface 30 of nut 26. It will be noted that the wedging elements 48 formed on the body portion do not necessarily need to form a continuous ring about the body portion but must, of course, be sufficiently encircling so as to provide an uninterrupted circumferential seal between tubing 10 and bore 16.

Another embodiment according to the invention provides an end cap construction as shown in FIGURES 6 and 7 which, respectively, show two stages of operation thereof.

An annular body portion 50 of a pipe fitting such as a T or L or other union, of resilient plastic such as the ABS Polymers mentioned above, includes a bore 52. Bore 52 can be capped off or otherwise closed by means of a nut 54 which is comparable to nut 26. Body portion 50 and nut 54, respectively, include wedging surfaces 56, 58. These surfaces are arranged to cooperate in a sliding wedging engagement to compress the end of body portion 50 sufficiently to close bore 52. The end of bore 52 is pinched together and extruded partially into an axial opening 60 in nut 54.

It will be noted that the angle of the slope to wedge surface 58 of the nut is less than that of wedge surfaces 56 of body portion 50. Thus, initial engagement between the wedge surfaces occurs at a more radially remote displacement and progresses toward the end of bore 52. With this relationship, the end of bore 52 is squeezed together commencing with the thicker wall portion and progressing to the thinner portion.

From the construction shown in FIGURES 6 and 7, it will be clear that for pipe constructions and the like, a closure device is provided comprising a first member having an annular body portion, such as fitting 50 which includes an elongated bore 52 formed within the body portion. The inside surface of the bore includes a surface region 62 circumferentially uninterrupted and extending axially along the bore to define a sealing zone 62 which is adapted to be circumferentially compressed. A wedging surface is defined around the outside of the body portion and is axially disposed laterally of sealing zone 62 whereby wedging surface 58 of nut 54 slidably cooperates with it to circumferentially compress body portion 50 in the region of the sealing zone.

As shown in FIGURES 6 and 7, the compression continues to a point forming a circumferentially uninterrupted seal extending around the sealing zones by totally closing off the end of bore 52. It will again be readily observed that the nut 54 is free to move axially until limited substantially only by refusal developed at the sealing zone 62. The material of body portion 50 is such that the refusal develops at a point within the elastic limit of the material. Thus, by backing off the nut 54, bore 52 reopens.

From the foregoing, it will be readily evident that there has been provided an improved fitting which serves in forming an improved seal which can be quickly effected without need for employment of O rings or other gasket material. It will also be evident that the fittings can be a one-piece injection molded fitting whereby such fittings can be manufactured at minimal expense.

Another embodiment according to the invention which is particularly preferred from the standpoint of serving to limit in a positive fashion the applied radial compression to a point within the elastic limit of the material of the fitting is shown in FIGURES 10–12. This embodiment is also particularly preferred by reason of its providing a stronger and shorter wedging portion while retaining a substantially equivalent length of slope to the cooperating wedging surfaces. The embodiment shown in FIGURES 10–12, as now to be described further, advantageously confines the outer end of the fitting in order to preclude radial enlargement thereof.

A length of cylindrical tubing 66 having a smooth outer peripheral surface at one end is adapted to be coupled to the fittings 67 by means of a nut member 68 which acts to apply radial compression to the fitting 67 in order to form a circumferentially uninterrupted seal around the smooth outer surface of tubing 66.

Thus, an elongated annular tube engaging body portion 69 of fitting 67 includes an elongated bore 71 formed and dimensioned to slidably receive the end of tubing 66. The inside surface of bore 71 includes a region 72 circumferentially uninterrupted and extending axially along the bore to define a sealing zone, hereinafter referred to by reference numeral 72, adjacent the smooth outer peripheral surface of tubing 66.

Body portion 69 is formed at the outer end of bore 71 to include radially inner and outer wedging surfaces 73, 74, and a groove 76 of V-shaped transverse cross-section between surfaces 73, 74 and disposed coaxially of bore 71. Surfaces 73, 74 are conically tapered to provide a wedging action when cooperating with nut member 68.

Member 68 is exteriorly formed with the usual flats to cooperate with a wrench in rotating same, and interiorly is generally hollow and open from end to end to pass tubing 66 coaxially into bore 71. A coaxially extending annular boss 77 is formed interiorly of nut member 68 and disposed to be slidably received by groove 76 so as to circumferentially compress the sealing zone 72 inwardly against the outer periphery of tubing 66. In this manner, an uninterrupted circumferential seal is formed between zone 72 and tubing 66.

Means are provided in nut member 68 for precluding radial enlargement of the end of body portion 69 during compression of sealing zone 72 upon tubing 66. Thus, an annular groove 78 is formed in nut member 68 radially outwardly of boss 77. The radially outer surface 79 of groove 78 is disposed to slidably engage the outer wedging surface 74 and radially confines it during axial movement of nut member 68 towards body portion 69 to urge surface 74 radially inwardly thereby precluding radial enlargement of the end of the body portion 69.

The axial extent of boss 77 serves to limit the degree of compression which can be applied by nut member 68 to a point within the elastic limit of the material of body portion 69 and thereby preserve the characteristic of a demountable pipe joint construction. The material of body portion 69 is preferably the same material as noted above with respect to earlier described embodiments.

From the foregoing, it should be noted that inner and outer frusto-conical wedging surfaces 73, 74 are provided around the outside of body portion 69 and are axially disposed laterally of sealing zone 72. Surfaces 73, 74 are in substantial concentricity with each other and spaced substantially parallel to one another. An annular arresting surface 81 is formed integral with body portion 69 and spaced in overlying relation to the inner wedging surface 73, so as to form therewith the sides of groove 76. Groove 76 thereby encircles the outer end of bore 71 in position to receive boss 77 when axially moved into same.

Boss 77 opposes groove 76 and includes a truncated frusto-conical cross-section which defines wedging surface 82 disposed to slidably cooperate with surface 73 in effecting radially inward compression upon sealing zone 72. Boss 77 includes an arresting surface 83 disposed radially outwardly of surface 82 so as to slidably engage arresting surface 81 and thereby limit axial movement of member 68 advancing towards body portion 69.

Wedging surfaces 79 and 82 are arranged substantially parallel in concentricity with each other so as to engage and force a portion of body portion 69 radially inwardly to provide sealing engagement between the various surfaces.

As shown in FIGURE 11, when nut member 68 is tightened upon the threads 84 of body portion 69, initially surfaces 73, 82 become engaged. Subsequently, the second point of engagement is defined between surfaces 74 and 79. As further axial movement of nut member 68 develops, zone 72 will become compressed against tubing 66 while surface 79 serves to inwardly divert the frusto-conical rim portion 86 of body portion 69 to provide sealing engagement between surfaces 81, 83.

From the foregoing, it will be readily apparent that compression applied to zone 72 is positively limited by the degree to which boss 77 can be drawn into groove 76. In this manner, compression of zone 72 shall be limited to a point within the elastic limit of the material of fitting 67.

It will also be readily apparent that the length of the taper of wedging surface 73 is considerably fore-shortened as respects the other wedging surfaces shown in previous embodiments. On the other hand, the aggregate tapered length of surfaces 73, 74 provides a comparable degree of compression and at the same time precludes radial enlargement of the end of body portion 69 whereby the coupling could otherwise be rendered difficult to demount.

I claim:

1. A pipe joint construction comprising a length of cylindrical tubing having a smooth outer peripheral surface at one end thereof, a fitting to be coupled to said end, the fitting including an elongated annular tube-engaging body portion, an elongated bore formed within said body portion and dimensioned to receive the end of said tubing introduced coaxially therein, the inside surface of said bore including a surface region circumferentially uninterrupted and extending axially along the bore to define a sealing zone adjacent the smooth outer peripheral surface of the tubing, a first frusto-conical wedging surface defined around the outside of said body portion and axially disposed laterally of said sealing zone, a second frusto-conical wedging surface defined around the outside of said body portion and axially disposed laterally of said sealing zone in concentricity with and spaced substantially parallel to said first wedging surface to respectively form radially inner and outer tapered wedging surfaces encircling the end of the body portion, an annular arresting surface integral with the body portion and spaced in overlying relation to the inner wedging surface to form therewith the sides of an annular groove having a V-shaped transverse cross-section, said groove thereby encircling the outer end of the bore, a hollow nut member adapted to pass said tubing therethrough coaxially of said bore, an annular boss coaxially formed within said member and adapted to oppose said groove, said boss having a truncated frusto-conical cross-section to define a third wedging surface disposed to slidably cooperate with said first wedging surface to circumferentially compress the sealing zone of the bore against the smooth outer peripheral surface of the tubing to form an uninterrupted circumferential seal therebetween and to define an arresting surface radially outwardly of said third wedging surface, to slidably engage said first named arresting surface and limit axial movement of said member towards the body portion, a fourth wedging surface formed within said nut member in concentricity with said bore and radially spaced substantially parallel to said third wedging surface to slidably cooperate with said second wedging surface to radially inwardly compress same and force a portion of said body portion radially inwardly to provide sealing engagement between said first and second named arresting surfaces, means for drawing said nut member axially along said body portion to first engage said first and third wedging surfaces and thereafter to engage said second and fourth wedging surfaces, said nut member being formed and disposed to be free to move axially until limited by ultimate penetration of said groove by said boss, the material of said body portion and axial and radial dimensioning of said boss with respect to said first named groove being such that said ultimate penetration develops at a point within the elastic limit of the material.

2. In a pipe joint construction adapted to form a seal with a length of cylindrical tubing having a smooth outer peripheral surface at one end thereof, a fitting to be coupled to said end, said fitting including an elongated annular tube-engaging body portion, an elongated bore formed within said body portion and dimensioned to be adapted to receive the end of said tubing coaxially introduced therein, the inside surface of said bore including a surface region circumferentially uninterrupted and extending axially along the bore to define a sealing zone adjacent the smooth outer peripheral surface of the tubing, said body portion being formed at the outer end of said bore to include radially inner and outer wedging surfaces and a groove of V-shaped transverse cross-section therebetween coaxially of the bore, a hollow nut member adapted to pass said tubing therethrough coaxially into said bore, a coaxially extending annular boss formed interiorly of said nut member and disposed to be slidably received by said groove to circumferentially compress said sealing zone of the bore against the smooth outer peripheral surface of the tubing to form an uninterrupted circumferential seal therebetween, an annular groove formed in said nut member radially outwardly of said boss, the radially outer surface of the last named groove being disposed to slidably engage said outer wedging surface and radially confine same during axial movement of said nut member towards said body portion so as to urge said outer wedging surface radially inwardly to preclude radial enlargement of the end of said body portion during compression of said sealing zone of said inner wedging surface, means for drawing said nut member axially along said body portion to develop said circumferential compression of said sealing zone against said tubing, the axial extent of said boss serving to limit said compression to a point within the elastic limit of said material to provide a demountable pipe joint construction.

References Cited by the Examiner

UNITED STATES PATENTS

| 1,196,928 | 9/1916 | Bylund | 285—334.2 |
| 2,670,973 | 3/1954 | Gunther et al. | |
| 2,755,110 | 7/1956 | Jacobs | 285—322 |
| 3,188,122 | 6/1965 | Smith | 285—369 |

FOREIGN PATENTS

| 1,123,385 | 6/1956 | France. |
| 933,560 | 8/1963 | Great Britain. |

CARL W. TOMLIN, *Primary Examiner.*

T. A. LISLE, *Assistant Examiner.*